US010078609B1

(12) United States Patent
Raju (10) Patent No.: US 10,078,609 B1
(45) Date of Patent: Sep. 18, 2018

(54) VIRTUALIZING A NON-USB DEVICE AS A USB DEVICE

(71) Applicant: Wyse Technology L.L.C., Santa Clara, CA (US)

(72) Inventor: Sriram Kumar Raju, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 0 days.

(21) Appl. No.: 15/460,526

(22) Filed: Mar. 16, 2017

(51) Int. Cl.
*G06F 13/12* (2006.01)
*G06F 13/38* (2006.01)
*G06F 13/00* (2006.01)
*G06F 13/42* (2006.01)
*G06F 13/40* (2006.01)

(52) U.S. Cl.
CPC ........ *G06F 13/385* (2013.01); *G06F 13/4072* (2013.01); *G06F 13/4282* (2013.01)

(58) Field of Classification Search
CPC .......... G06F 2213/0042; G06F 13/102; G06F 13/36; G06F 13/4282; G06F 13/385; G06F 13/4081; G06F 9/4411
USPC .......................................... 710/63, 104, 105
See application file for complete search history.

(56) References Cited

U.S. PATENT DOCUMENTS

| | | | | |
|---|---|---|---|---|
| 6,567,875 | B1* | 5/2003 | Williams | G06F 13/105 710/302 |
| 6,643,714 | B1* | 11/2003 | Chrysanthakopoulos | G06F 13/102 370/202 |
| 6,742,073 | B1* | 5/2004 | Poisner | G06F 13/4004 710/305 |
| 2002/0156952 | A1* | 10/2002 | Shono | G06F 13/4081 710/104 |
| 2007/0011374 | A1* | 1/2007 | Kumar | G06F 9/4411 710/105 |
| 2007/0174534 | A1* | 7/2007 | Wurzburg | G06F 13/385 710/315 |
| 2012/0159010 | A1* | 6/2012 | Jiang | G06F 13/102 710/16 |
| 2012/0331202 | A1* | 12/2012 | Cohen | G06F 13/102 710/313 |
| 2014/0268229 | A1* | 9/2014 | Kempka | G06F 9/4413 358/1.15 |
| 2015/0281409 | A1* | 10/2015 | Tatiya | G06F 13/385 709/217 |
| 2017/0180516 | A1* | 6/2017 | Chauhan | H04L 69/08 |

* cited by examiner

*Primary Examiner* — Faisal M Zaman
(74) *Attorney, Agent, or Firm* — Kirton McConkie; Brian Tucker (57) ABSTRACT

A non-USB device can be virtualized as a USB device. When a non-USB device is connected to a client terminal, a filter driver can be employed to cause the non-USB device to be treated as a USB device to thereby allow the device to be redirected using USB device redirection techniques. When an I/O request is sent to the redirected device, the request will be in USB format since the server-side components will view the redirected device as a USB device. Then, the I/O request can be converted from the USB format into a format suitable for the non-USB device. Any response generated by the non-USB device can be converted to USB format in a similar manner. As a result, non-USB devices can be redirected without altering any of the existing server-side VDI components.

20 Claims, 11 Drawing Sheets

VIRTUALIZING A NON-USB DEVICE AS A USB DEVICE

CROSS-REFERENCE TO RELATED APPLICATIONS

N/A

BACKGROUND

The present invention is generally directed to device redirection in a virtual desktop infrastructure (VDI) environment. Device redirection generally refers to making a device that is connected to a client accessible within a virtual desktop as if the device had been physically connected to the virtual desktop. In other words, when device redirection is implemented, a user can connect a device to his or her client terminal and the device will function as if it had been connected to the server.

Figure 1:
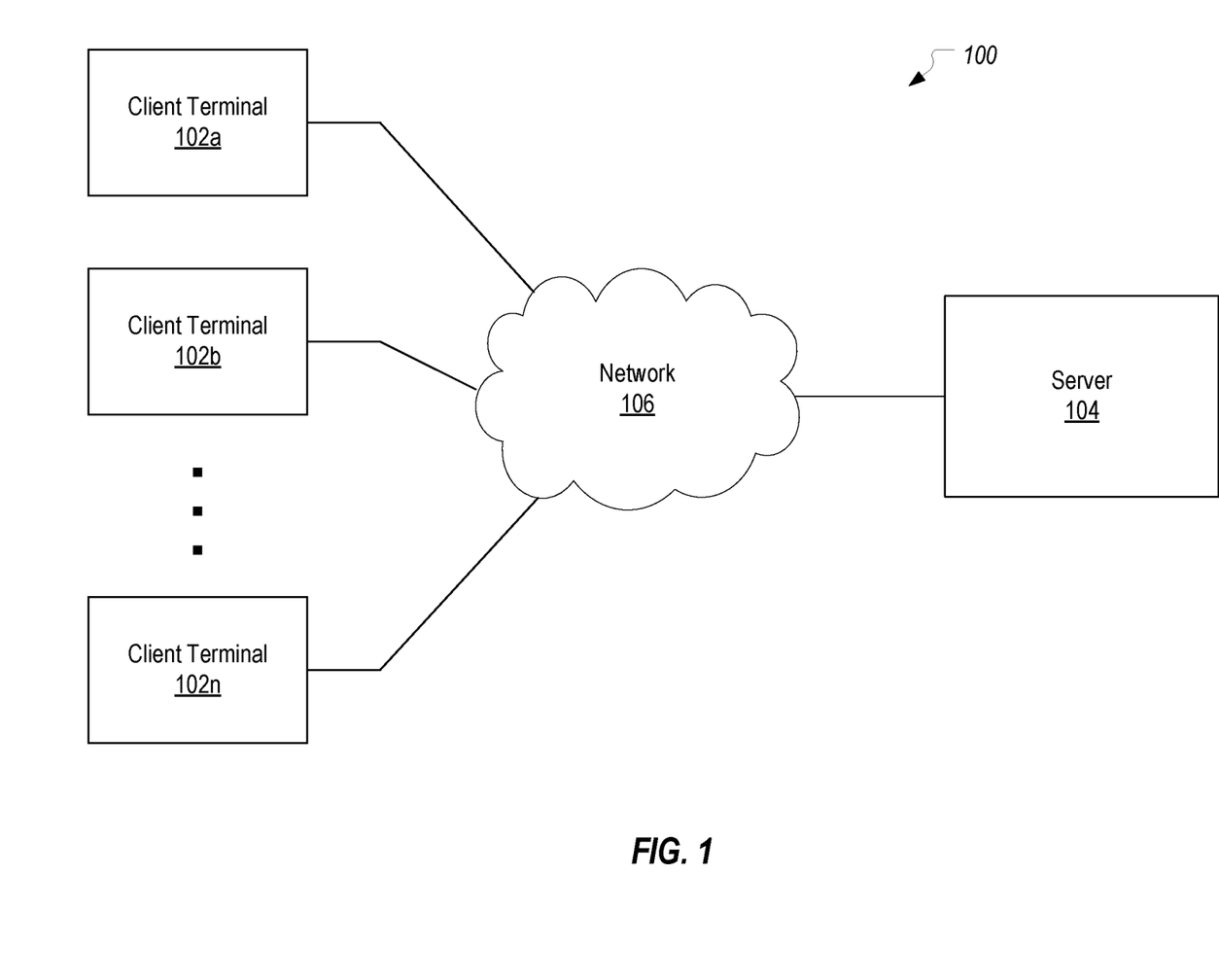
FIG. 1 illustrates an example computing environment in which the present invention can be implemented.
Figure 2:
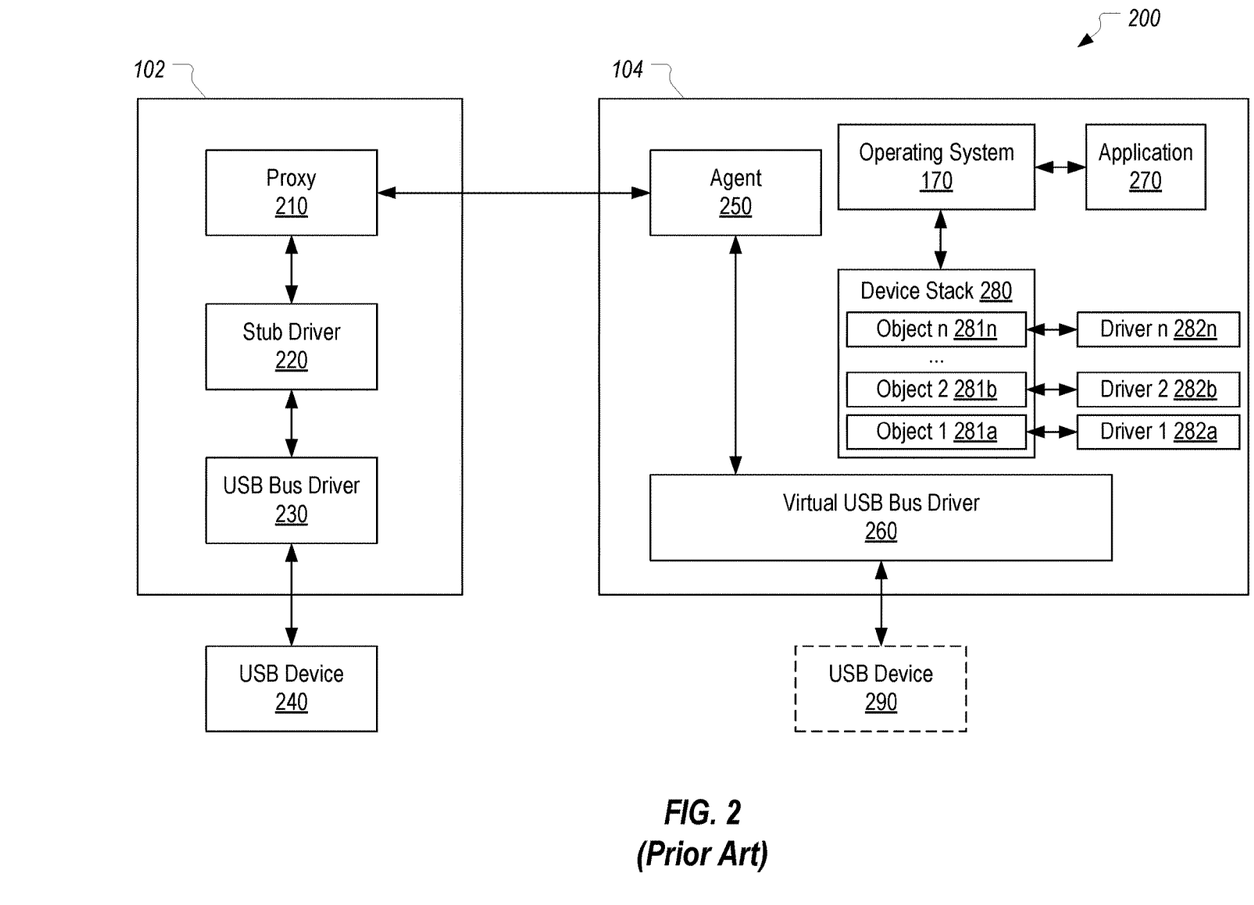
FIG. 2 illustrates a USB device redirection architecture.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a USB bus driver 230. Client 102 can be connected to a USB device 240, as shown in FIG. 2. Server 104 may include an agent 250 and a virtual USB bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

Although a majority of peripheral devices are USB devices and can therefore be virtualized on a server using the above-described techniques, there are still many non-USB devices that a user may desire to connect to client terminal 102 such as serial port, parallel port, Bluetooth, and GPIO (general-purpose input output) devices. Unfortunately, current VDI solutions do not provide techniques for redirecting non-USB devices. Therefore, if a user were to connect a non-USB device to client terminal 102, it may only be accessible locally but not within a remote session on server 104.

BRIEF SUMMARY

The present invention extends to methods, systems, and computer program products for virtualizing a non-USB device as a USB device. When a non-USB device is connected to a client terminal, a filter driver can be employed to cause the non-USB device to be treated as a USB device to thereby allow the device to be redirected using USB device redirection techniques. When an I/O request is sent to the redirected device, the request will be in USB format since the server-side components will view the redirected device as a USB device. Then, the I/O request can be converted from the USB format into a format suitable for the non-USB device. Any response generated by the non-USB device can be converted to USB format in a similar manner. As a result, non-USB devices can be redirected without altering any of the existing server-side VDI components.

In one embodiment, the present invention is implemented as a method for virtualizing a non-USB device as a USB device. A filter driver can detect that a non-USB device has been connected to a client terminal. The filter driver can identify a set of pseudo USB descriptors that are associated with the non-USB device and send the set of pseudo USB descriptors to a hook driver. The hook driver can cause a pseudo USB device to be enumerated based on the set of pseudo USB descriptors such that a stub driver is loaded on the client terminal. The stub driver can then report to a proxy that a USB device has been connected to the client terminal to thereby cause the proxy to redirect the USB device to a server.

In another embodiment, the present invention is implemented as computer storage media storing computer-executable instructions which when executed on a client terminal implement a filter driver, a hook driver, and a stub driver. The filter driver is configured to be loaded on top of a non-USB driver when a non-USB device is connected to the client terminal. The filter driver is further configured to identify a set of pseudo USB descriptors for the non-USB device and to provide the set of pseudo USB descriptors to a hook driver. The hook driver is configured to cause a pseudo USB device to be enumerated using the set of pseudo USB descriptors. The stub driver is configured to be loaded when the pseudo USB device is enumerated. The stub driver is further configured to report a set of USB descriptors to a proxy to cause the proxy to redirect a USB device to a server. The stub driver is additionally configured to receive USB request blocks that target the USB device, extract a payload from each USB request block, and provide the payload to the filter driver for routing to the non-USB device.

In another embodiment, the present invention is implemented as method for enabling a non-USB device that is connected to a client terminal to be accessed from a server as a USB device. It can be reported to a server that that a USB device has been connected to the client terminal to thereby cause a USB device stack for the USB device to be loaded on the server. A USB request block that targets the USB device can then be received from the server. The USB request block can be routed to a stub driver on the client terminal. The stub driver can extract content of the USB request block. The stub driver can provide the extracted content to a filter driver that is loaded on a device stack for the non-USB device to thereby allow the filter driver to direct the content to the non-USB device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, a "non-USB device" should be construed as an I/O peripheral device that connects to a client terminal using an interface other than USB. Therefore, a non-USB device may connect via a serial port (e.g., an RS-232 device), a parallel port (e.g., a non-USB printer), a wireless protocol (e.g., Bluetooth), a GPIO pin or port, etc. In general, a non-USB device can be viewed as a device that does not employ USB request blocks (URBs) to communicate with the client terminal.

Figure 3:
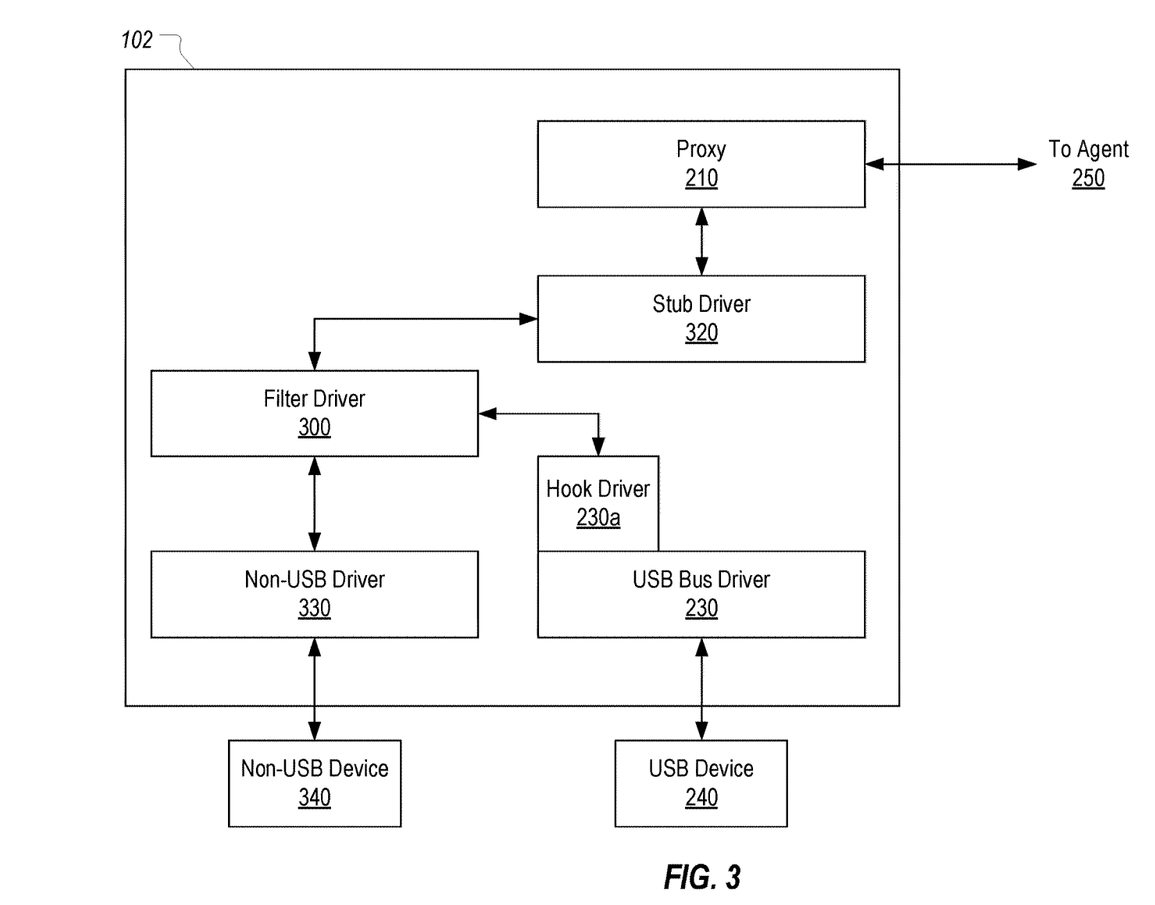
FIG. 3 illustrates a client-side architecture that can be employed to redirect a non-USB device as a USB device.

FIG. 3 illustrates how the client-side architecture depicted in FIG. 2 can be modified to allow a non-USB device connected to client terminal 102 to be redirected to server 104 as a USB device. Server 104 is omitted from FIG. 3 since the server-side components can be the same as described above in the background. Importantly, due to the techniques of the present invention, the server-side components will view a redirected non-USB device as if it were a USB device thereby allowing the server-side components to access the non-USB device using the USB redirection techniques described in the background.

In FIG. 3, client terminal 102 is shown as including each of the same components that are depicted in FIG. 2 including USB bus driver 230 (which may be the standard USB bus driver provided by the operating system (e.g., usbhub.sys in Windows)). As is known, one role of USB bus driver 230 is to enumerate USB devices that have been connected to client terminal 102 as part of the plug-and-play process.

Client terminal 102 is also shown as including a non-USB driver 330 which can represent the standard driver(s) that the operating system loads when a particular type of non-USB device is connected. For this example, it will be assumed that non-USB device 340 is connected to a serial port and that client terminal 102 is running windows. Therefore, non-USB driver 330 can represent the serial port driver, serial.sys. On the other hand, if non-USB device 340 were connected to a parallel port, via Bluetooth, or via some other non-USB interface, non-USB driver 330 would represent the corresponding driver(s) that would be loaded.

As an overview of the present invention, a filter driver 300 can be registered with the operating system to be loaded above non-USB driver 330 to allow filter driver 300 to intercept communications to/from non-USB device 340. Importantly, filter driver 300 can be configured to determine when non-USB device 340 is connected and to initiate a process of loading a pseudo USB device to represent the non-USB device. In particular, when filter driver 300 detects that non-USB device 340 has been connected, it can communicate with hook driver 230a, which can be configured to alter the functionality of USB bus driver 230, to allow hook driver 230a to report the connection of a pseudo USB device that will represent non-USB device 340. A stub driver 320 can be registered to be loaded when the pseudo USB device is enumerated. Stub driver 320 can be configured to perform the conversion of I/O requests between USB format and a format suitable for non-USB device 340 and to deliver converted I/O requests to filter driver 300 for delivery to non-USB driver 330.

In short, stub driver 320 can be configured to represent non-USB device 340 as a USB device to thereby allow the server-side components to communicate with non-USB device 340 using USB redirection techniques (e.g., by sending URBs intended for non-USB device 340). Stub driver 320 can then act as an intermediary for processing such communications in a manner that will allow them to be delivered to and handled by non-USB driver 330.

FIGS. 4A-4D illustrate example steps that can be performed when non-USB device 340 is connected to client terminal 102. For purposes of this example, it will be assumed that non-USB driver 330 is not loaded when non-USB device 340 is connected. In step 1 shown in FIG. 4A, non-USB device 340 is connected (e.g., via a serial port) resulting in non-USB driver 330 (e.g., serial.sys) being loaded. The loading of non-USB driver 330 can occur automatically (e.g., as part of the plug-and-play process) or manually. Filter driver 300 can be registered for this type of device such that the operating system will load filter driver 300 on top of non-USB driver 330 in step 2.

Because filter driver 300 is loaded on the device stack of non-USB device 340, it will be able to retrieve information about non-USB device 340 including, for example, the type of device that non-USB device 340 is. In the present example, it will be assumed that non-USB device 340 is a printer connected to a serial port. As shown in step 3 of FIG. 4B, filter driver 300 can be configured to obtain such information from non-USB device 340. Alternatively, in some cases, the necessary information can be retrieved from non-USB driver 330 or can be derived by filter driver 300 based on which driver(s) are below it in the device stack. For example, filter driver 300 may identify non-USB device 340 as a serial port device based on the fact that non-USB driver 330 is serial.sys.

Figure 4A:
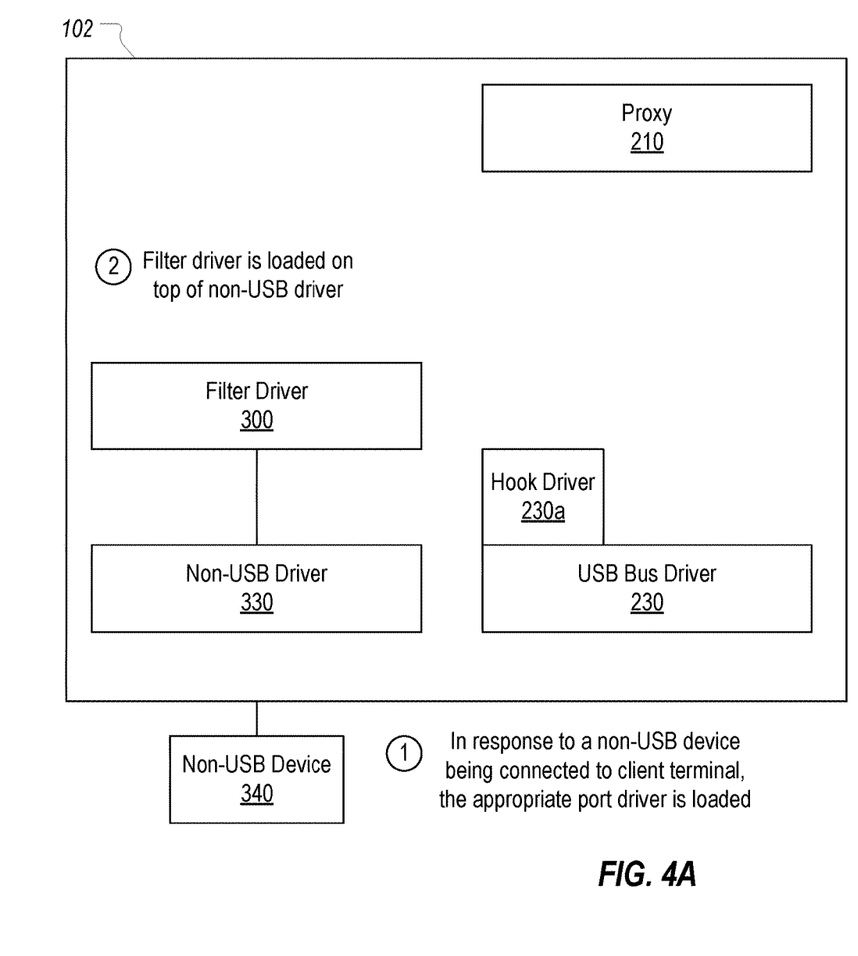
FIGS. 4A-4D illustrate an example sequence of steps that can be performed to virtualize a non-USB device as a USB device.
Figure 4B:
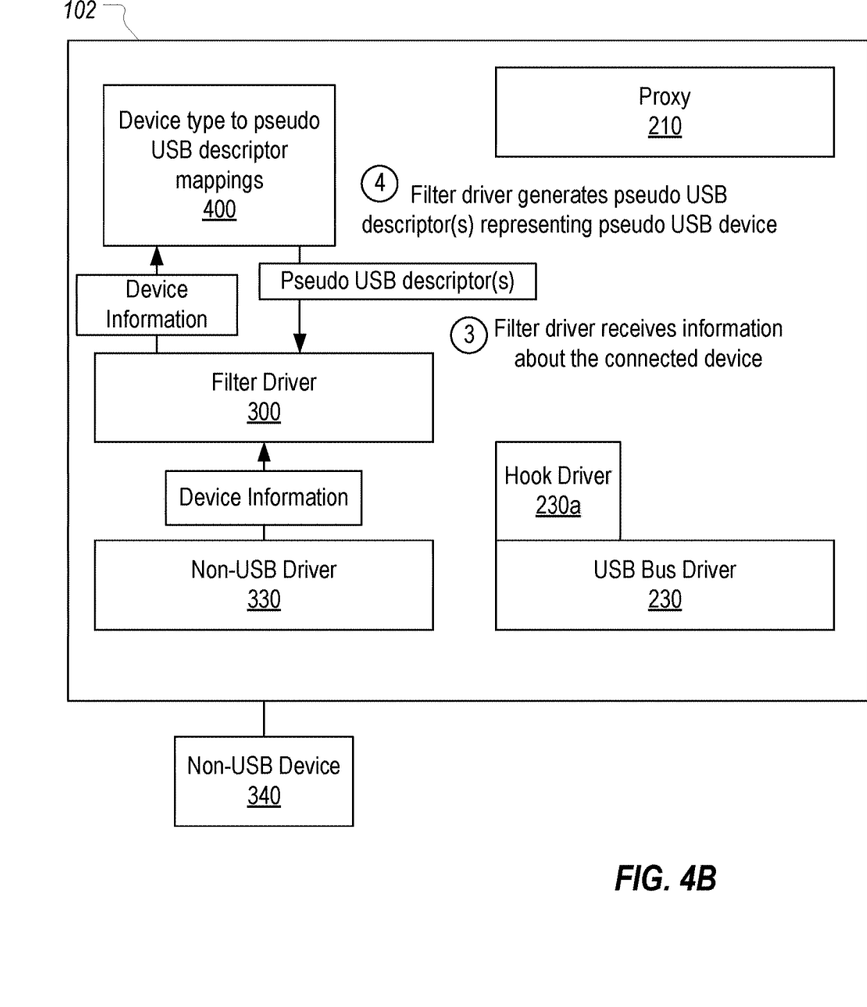

Regardless of how filter driver 300 determines the type of non-USB device 340, it can employ the device information it receives in step 3 to create one or more "pseudo USB descriptors" that identify a "pseudo USB device." As is known, the USB_DEVICE_DESCRIPTOR, USB_CON-FIGURATION_DESCRIPTOR, and USB_INTERFACE_DESCRIPTOR structures are employed by USB client drivers to define a particular type of USB device. A pseudo USB descriptor can be in the form of one of these data structures (or at least define values for some or all of the members of these data structures). However, the combination of data in a set of pseudo USB descriptors can represent a pseudo USB device (as opposed to an actual USB device). In other words, as will be further described below, a set of one or more pseudo USB descriptors can be associated with a particular stub driver to cause the stub driver to be loaded when a device matching the descriptors is enumerated on client terminal 102.

Accordingly, filter driver 300 can generate a set of pseudo USB descriptors based on what type of device non-USB device 340 is. This can be accomplished in various ways. For example, filter driver 300 may maintain or have access to a table 400 that maps a particular type of non-USB device to a particular set of pseudo USB descriptors. For example, in step 4, filter driver 300 is shown as employing the information about non-USB device 340 to retrieve one or more pseudo USB descriptors that are associated with this information in table 400. In this example, the pseudo USB descriptor(s) can define a pseudo USB-to-serial device on client terminal 102. It is noted that a set of pseudo USB descriptors that defines a particular pseudo USB device will not define an actual USB device (or at least should not define an actual USB device for which an actual driver may exist on client terminal 102). This is because a set of pseudo USB descriptors will be employed to cause the appropriate stub driver (as opposed to an actual USB device driver) to be loaded.

Figure 4C:
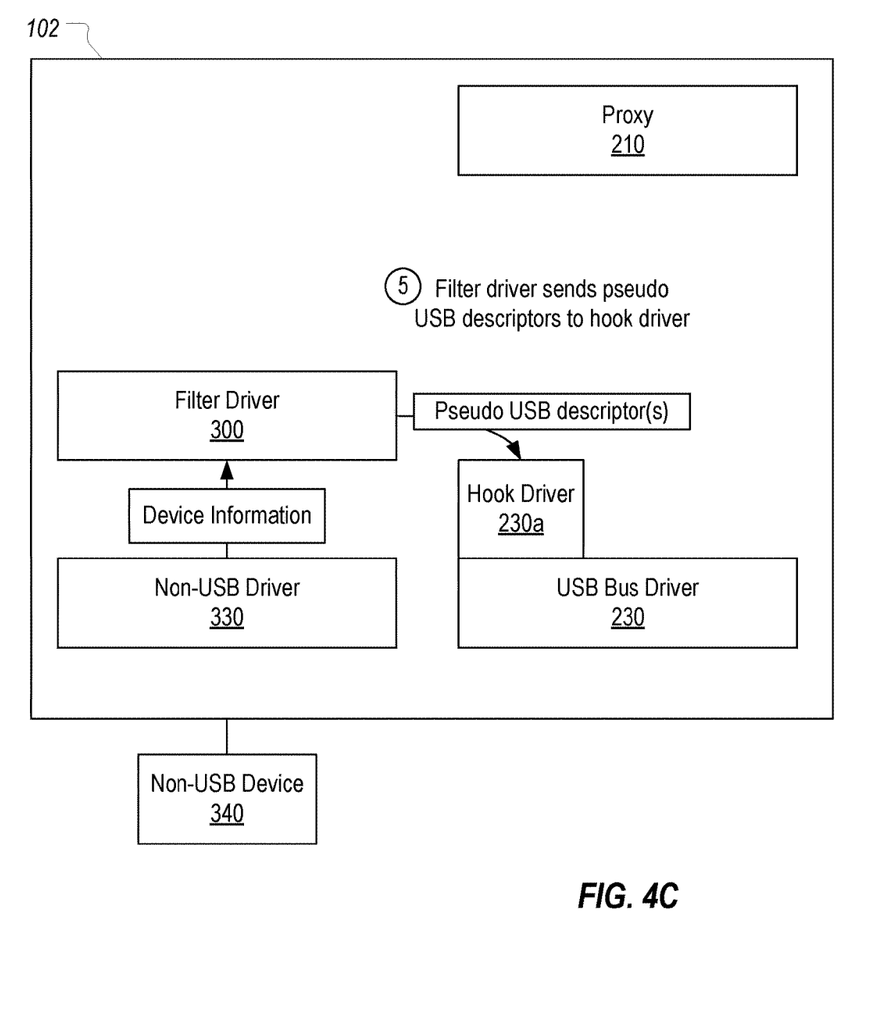

As represented in step 5 shown in FIG. 4C, once filter driver 300 has generated an appropriate set of pseudo USB descriptors for the type of non-USB device 340, it can provide the set of pseudo USB descriptors to hook driver 230a (e.g., as part of a notification that a non-USB device has been connected). Hook driver 230a can be configured to modify the functionality of USB bus driver 230 to cause a pseudo USB device to be enumerated based on the received pseudo USB descriptors.

As is known, USB bus driver 230 is tasked with enumerating each device that is connected to the bus which includes creating a physical device object (PDO) to represent the device. This enumeration process will typically occur when USB bus driver 230 detects that a new device has been connected (e.g., when it receives a hot-plug notification) and notifies the plug-and-play manager (e.g., by calling IoInvalidateDeviceRelations). In response, the plug-and-play manager will send an IRP (e.g., IRP_MN_QUERY_DEVICE_RELATIONS) which will cause USB bus driver 230 to create a PDO for any newly connected device or to delete the PDO for any disconnected device. In this way, USB bus driver 230 notifies the plug-and-play manager of which devices are connected. When a new PDO is created, the plug-and-play manager will detect this and load an appropriate driver for the PDO.

Hook driver 230a can be configured to manipulate this enumeration process to cause a PDO to be created for a pseudo USB device based on the set of pseudo USB descriptors it received from filter driver 300. For example, in response to receiving the descriptor(s) from filter driver 300, hook driver 230a could cause IoInvalidateDeviceRelations to be called to initiate the enumeration process. Then, hook driver 230a could monitor for the IRP_MN_QUERY_DEVICE_RELATIONS and create a PDO for the pseudo USB device thereby creating the appearance that a USB device has been connected to the bus.

The plug-and-play manager will detect the new PDO and will commence the process of configuring the device. For example, the plug-and-play manager can send a number of IRPs to USB bus driver 230 to retrieve the hardware IDs for the device (e.g., by sending an IRP_MN_QUERY_ID for each of BusQueryDeviceID, BusQueryInstanceID, BusQueryHardwareIDs, BusQueryCompatibleIDs, and BusQueryContainerID). Hook driver 230a can be configured to detect these IRPs and can employ the set of pseudo USB descriptors received from filter driver 300 to complete them. In other words, hook driver 230a will cause USB bus driver 230 to report that a device having the characteristics defined in the set of pseudo USB descriptors has been connected to the bus.

The plug-and-play manager will employ the set of pseudo USB descriptors it receives via the IRPs to locate and load the appropriate driver for the pseudo USB device. As mentioned above, an appropriately configured stub driver can be registered to be loaded when a device having the pseudo USB descriptors is connected. In this example, it will be assumed that stub driver 320 is associated with the set of pseudo USB descriptors that filter driver 300 reported, and therefore, in step 6 shown in FIG. 4D, the plug-and-play manager will cause stub driver 320 to be loaded in the device stack for the pseudo USB device. Stub driver 320 can be configured to notify proxy 210 of the "connection" of the pseudo USB device including by providing actual USB descriptor(s) that will be used on the server to load the appropriate device stack. In this context, "actual" refers to the fact that the USB descriptors provided to proxy 210 will define an actual USB device (e.g., a USB printer) so that a proper USB device stack will be loaded on the server. In other words, pseudo USB descriptors serve the purpose of causing a stub driver that knows how to implement the present invention to be loaded on client terminal 102 whereas actual USB descriptors serve the purpose of causing a functional USB device stack to be loaded on server 104.

Figure 4D:
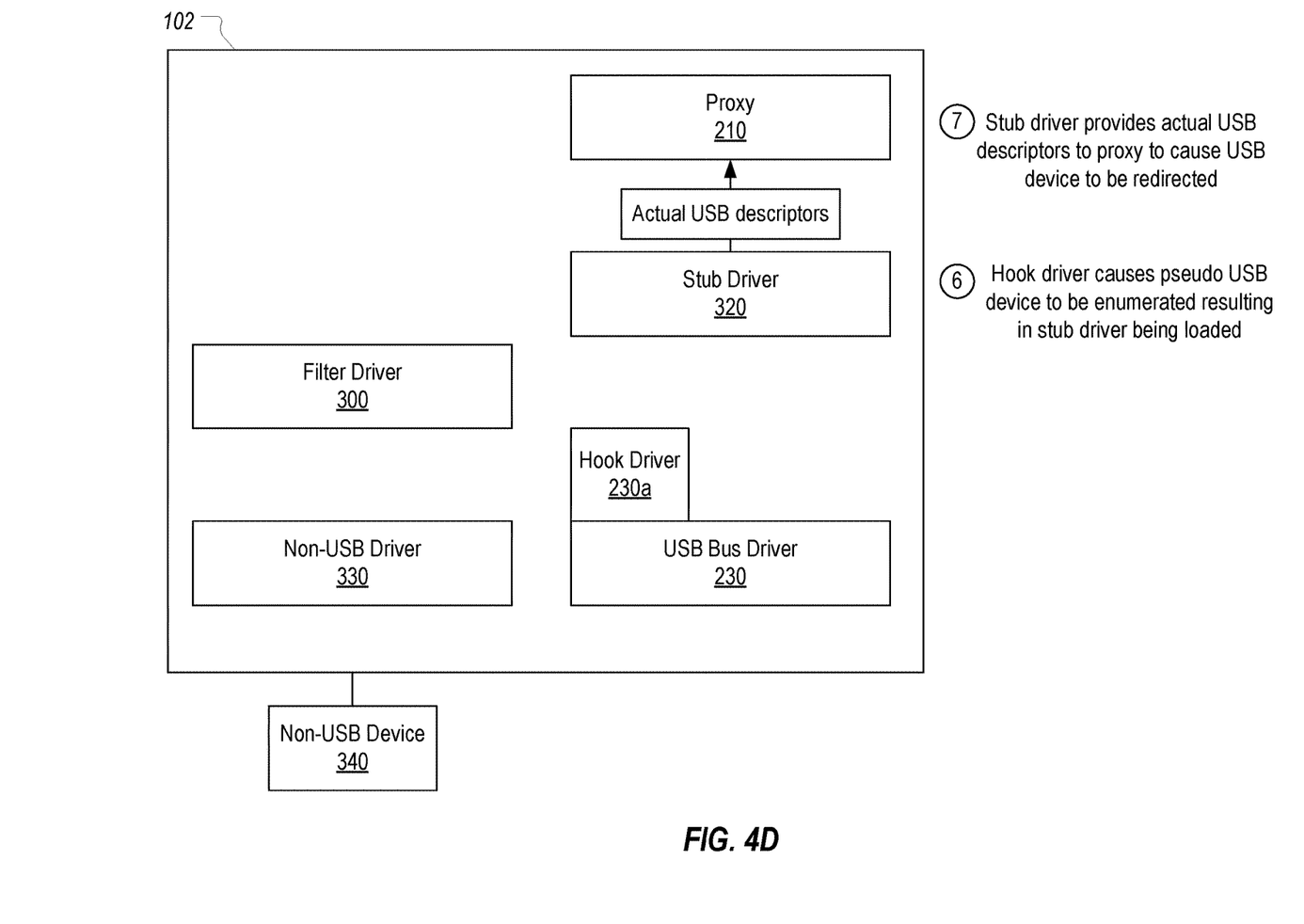

To allow stub driver 320 to provide the appropriate actual USB descriptors to proxy 210, various techniques can be employed. For example, multiple stub drivers could be created where each stub driver is specific to a particular type of pseudo USB device (e.g., stub driver 320 may only be loaded when a serial port printer is connected while another stub driver may only be loaded when a parallel port printer is connected or when a different type of device is connected to the serial port). In such a case, the stub driver may report the same actual USB descriptors to proxy 210 whenever it is loaded (e.g., stub driver 320 could be configured to always report USB descriptors for a USB printer).

Alternatively, a single stub driver could be configured to handle multiple types of non-USB devices (e.g., stub driver 320 could be loaded when non-USB device 340 is connected to a serial port as well as when another non-USB device is connected to a parallel port). In such a case, the stub driver can be configured to generate actual USB descriptors based on the type of non-USB device that has been connected. This could be accomplished in a similar manner as filter driver 300 generates the pseudo USB descriptors (e.g., by accessing a table that maps device information to actual USB descriptors). In any case, the stub driver that is loaded for a particular pseudo USB device will report the connection of an appropriate type of USB device so that the USB device will be virtualized on the server.

After step 7, the USB redirection techniques described in the background will be performed in a typical manner on the server side to cause an appropriate USB device stack to be loaded. Therefore, with reference to FIG. 2, the connection of non-USB device 340 can cause virtual USB device 290 to appear on server 104 in the same manner (at least from server 104's perspective) as if USB device 240 had been connected. For example, if non-USB device 340 is a serial port printer, application 270 may see a USB printer. At this point, the server-side components will be able to send I/O requests to the virtualized USB device and these I/O requests will be redirected to proxy 210 in the manner described in the background.

Because a USB device is virtualized on server 104, an I/O request targeting the virtualized device will be in the form of a USB request block (or an URB). More specifically, the USB device stack on server 104 will generate an URB describing the I/O request and associate the URB with an IRP that will be passed down to virtual USB bus driver 260 which will route it to proxy 210 via agent 250. Therefore, the redirected I/O request that proxy 210 receives will include an URB.

Figure 5A:
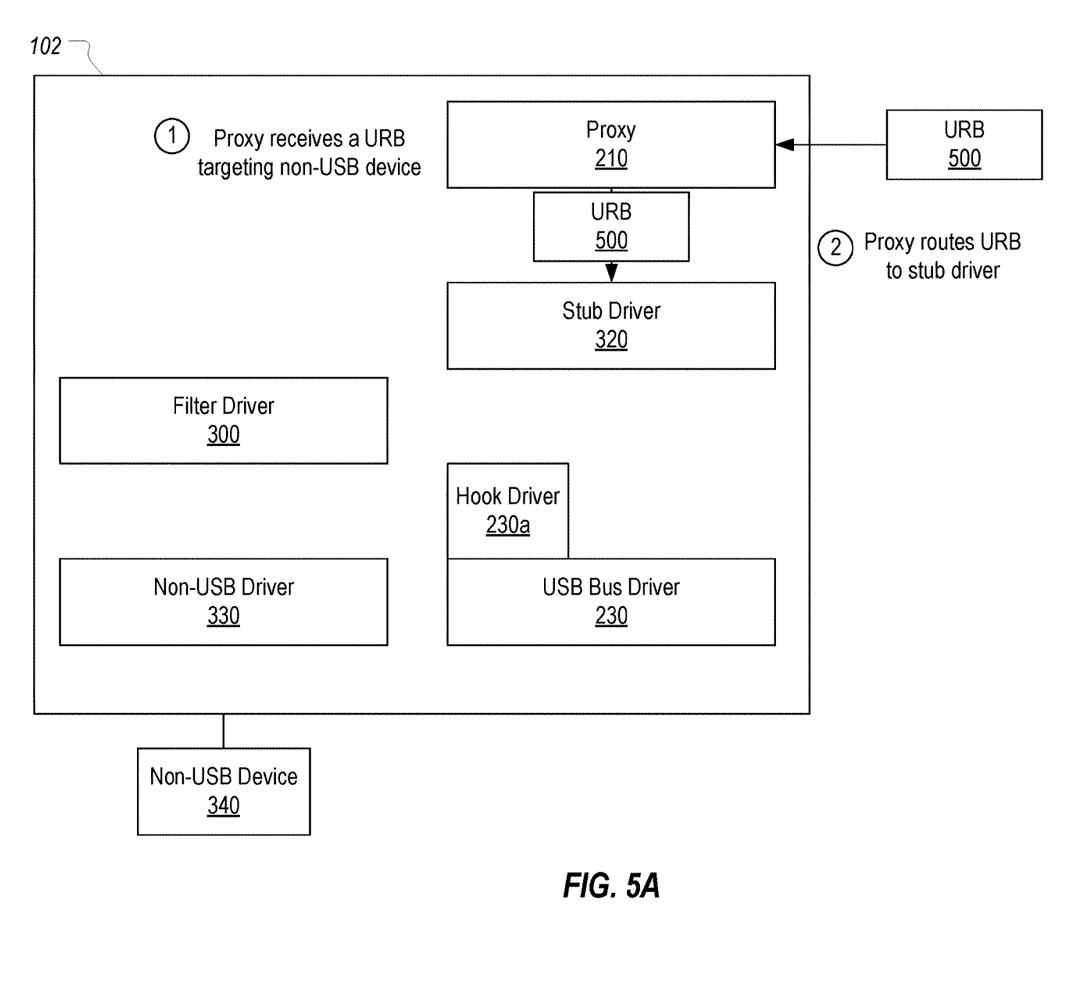
FIGS. 5A-5C illustrate an example sequence of steps that can be performed to convert I/O requests between USB format and a format suitable for the non-USB device.
Figure 5B:
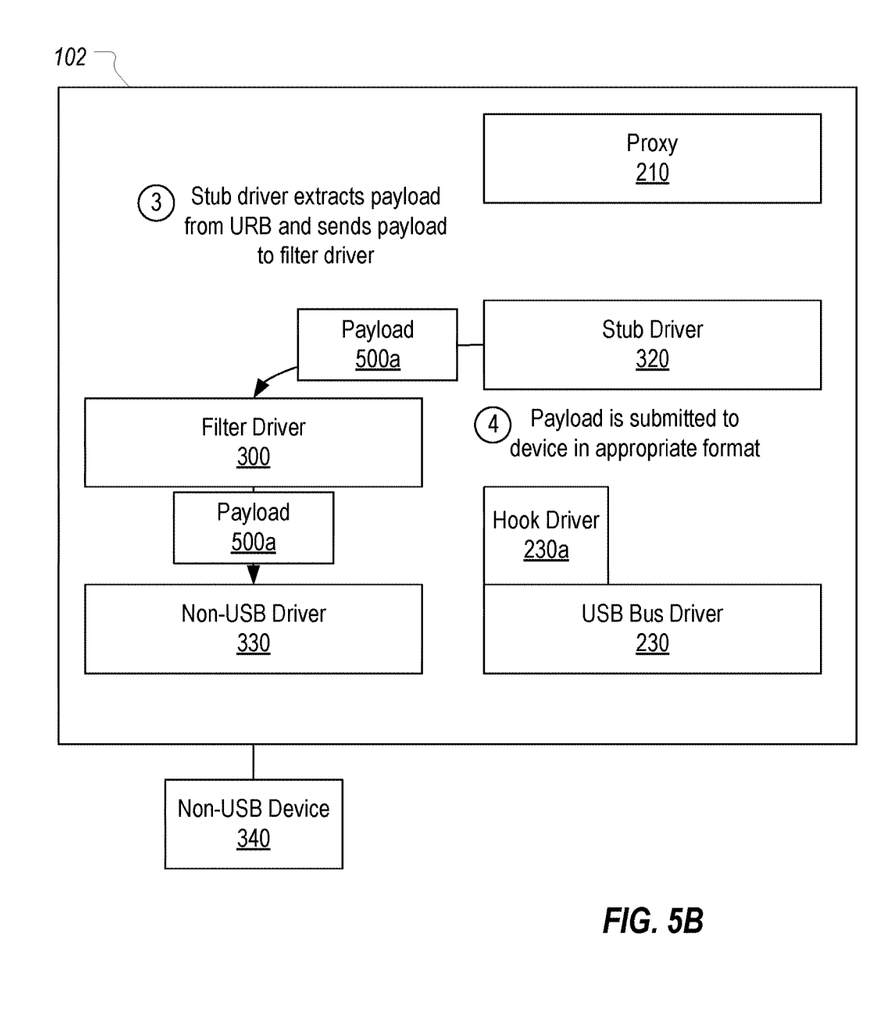
Figure 5C:
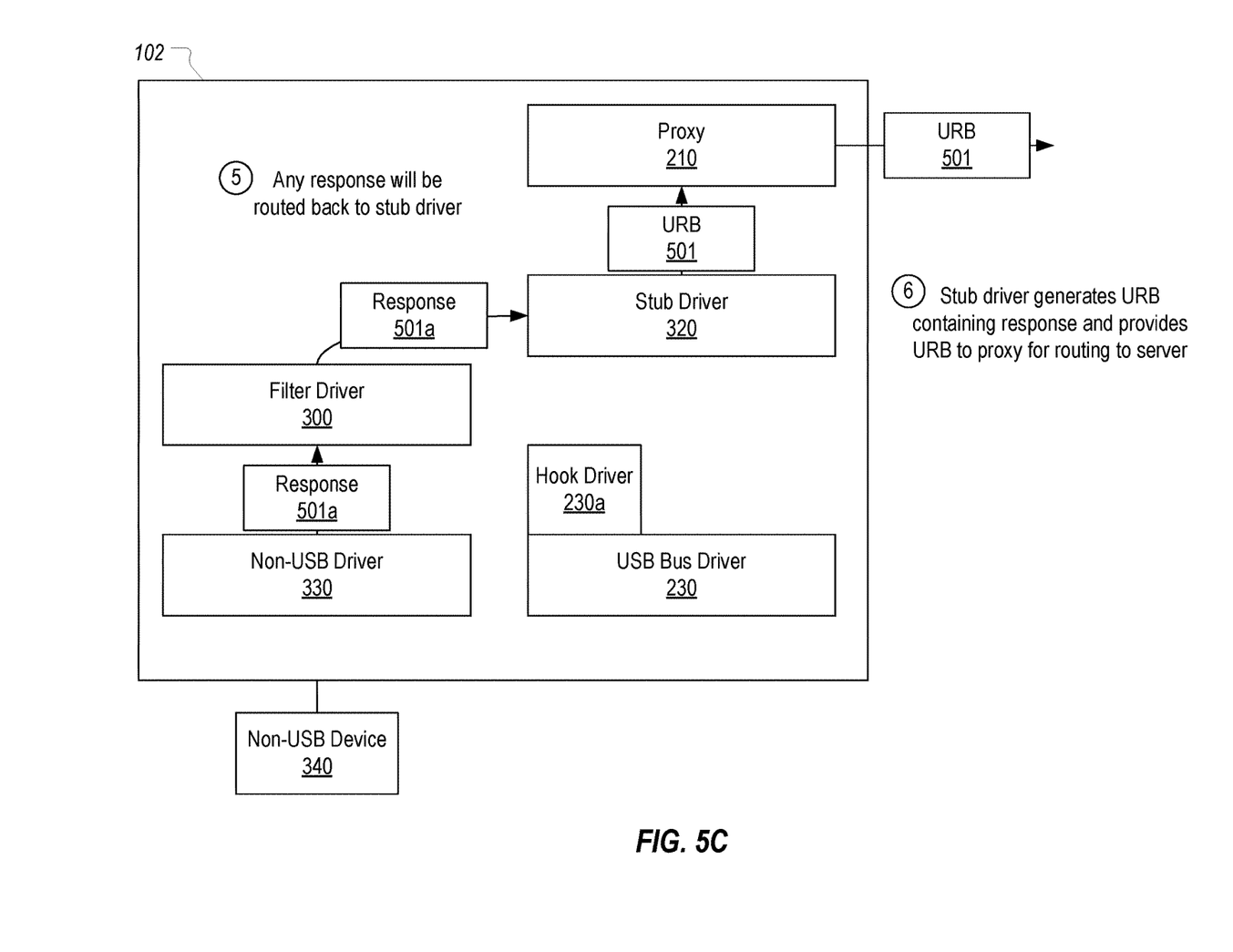

FIGS. 5A-5C illustrate an example of how a redirected I/O request can be handled on client terminal 102. In step 1 shown in FIG. 5A, it is assumed that proxy 210 receives an URB 500 from agent 250. For ease of illustration, the I/O request will be represented only as URB 500. However, it should be understood that additional information (e.g., information about the IRP with which the URB is associated) would be included in the communication(s) containing URB 500. Suffice it to say that sufficient information would be included with URB 500 to identify to proxy 210 that the I/O request targets the actual USB device that stub driver 320 reported to proxy 210 in step 7 of FIG. 4D.

As a result, proxy 210 can provide URB 500 to stub driver 320 in step 2. Many different techniques could be employed by proxy 210 to transfer URB 500 to stub driver 320 including, e.g., by calling WriteFile, DeviceIoControl, or another I/O function that causes an IRP that contains the URB to be directed towards the pseudo USB device. It is noted that, in order to pass URB 500 to stub driver 320, it will be necessary to direct an IRP towards the pseudo USB device since stub driver 320 will be positioned in the device stack for the pseudo USB device. Proxy 210 can maintain sufficient information to allow it to direct IRPs in this manner. For example, proxy 210 can maintain a mapping between the actual USB device that URB 500 targets and the pseudo USB device for which stub driver 320 has been loaded. In such a case, proxy 210 could open a handle to the pseudo USB device and use the handle to direct I/O requests to the pseudo USB device.

Any I/O request that targets the pseudo USB device will be passed to stub driver 320. Since the I/O requests will be in the form of URBs, stub driver 320 can convert the requests into an appropriate format for non-USB device 340. For example, as shown in step 3 in FIG. 5B, stub driver 320 can extract the payload from URB 500 (e.g., by removing the URB header) and then pass the IRP that contains this payload to filter driver 300. Filter driver 300 can then pass this IRP containing the payload onto non-USB driver 330 in step 4. Non-USB driver 330 (and any other lower level drivers) can then perform the necessary functions to pass the payload to non-USB device 340 (e.g., by using the RS-232 standard to transfer the payload). This payload can represent any of the numerous types of I/O requests that may be available for a particular type of device.

Finally, after processing the I/O request defined in the payload, non-USB device 340 may send a response that will be passed back up the stack to non-USB driver 330. Non- USB driver 330 may then pass a response 501*a* (which may be in the form of an IRP) to filter driver 300 which can then pass response 501*a* to stub driver 320 in step 5 shown in FIG. 5C. Response 501*a* will not be in the form of an URB and therefore stub driver 320 can convert response 501*a* into URB 501 and pass URB 501 to proxy 210 (e.g., by completing the IRP after the response has been formatted as an URB) for routing back to server 104 in step 6. Accordingly, the fact that non-USB device 340 is not a USB device is entirely hidden from server 104.

In summary, filter driver 300 and hook driver 230*a* can work together to cause a pseudo USB device to be enumerated on client terminal 102 when a non-USB device is connected. Stub driver 320, which will be loaded when the pseudo USB device is enumerated, can cause an appropriate USB device to be redirected to the server. Stub driver 320 can convert any USB-formatted I/O requests that are directed towards the redirected device into a format suitable for the non-USB device. In this way, a non-USB device can be redirected as if it were a USB device.

Figure 6:
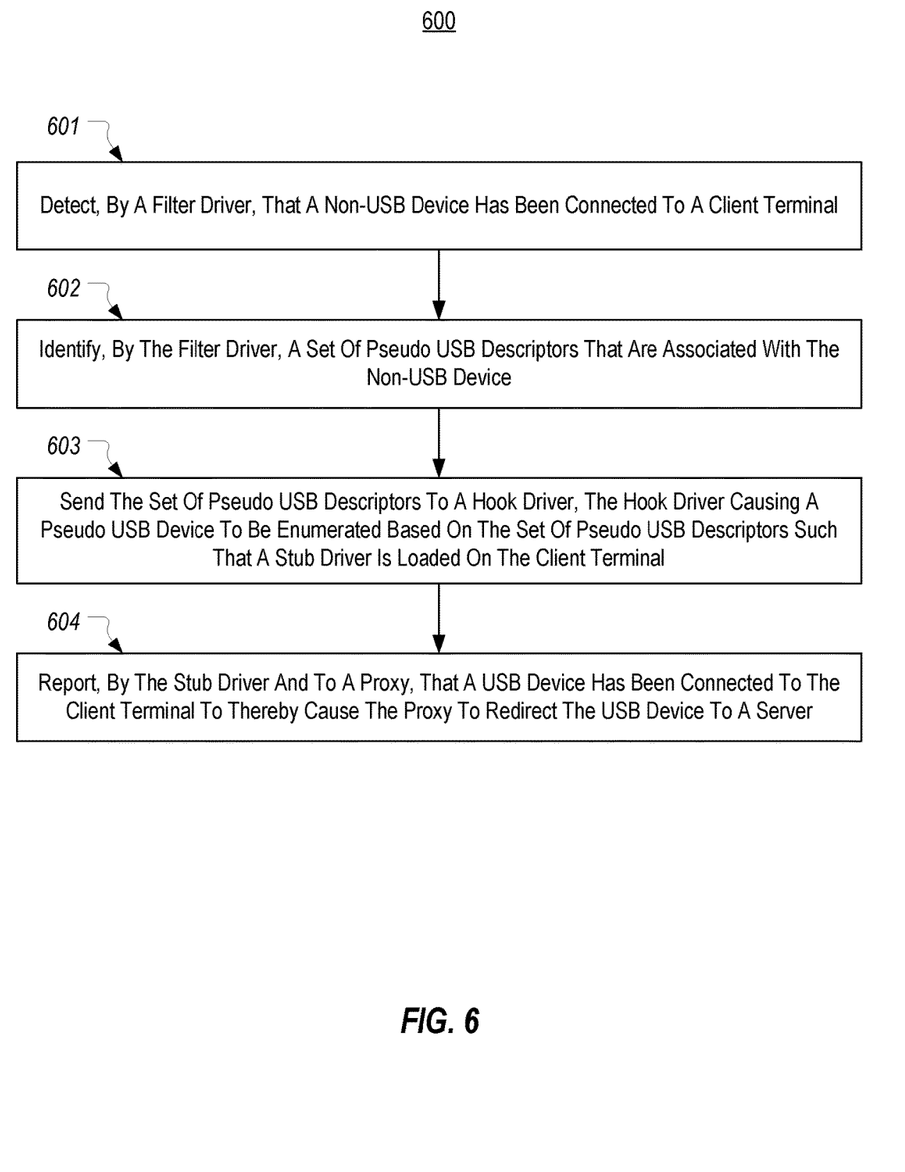
FIG. 6 provides a flowchart of an example method for virtualizing a non-USB device as a USB device.

FIG. 6 illustrates a flowchart of an example method 600 for virtualizing a non-USB device as a USB device. Method 600 can be implemented on a client terminal in a VDI environment.

Method 600 includes an act 601 of detecting, by a filter driver, that a non-USB device has been connected to a client terminal. For example, filter driver 300 can determine that non-USB device 340 has been connected to client terminal 102.

Method 600 includes an act 602 of identifying, by the filter driver, a set of pseudo USB descriptors that are associated with the non-USB device. For example, filter driver 300 can identify a set of pseudo USB descriptors for non-USB device 340.

Method 600 includes an act 603 of sending the set of pseudo USB descriptors to a hook driver, the hook driver causing a pseudo USB device to be enumerated based on the set of pseudo USB descriptors such that a stub driver is loaded on the client terminal. For example, filter driver 300 can send the set of pseudo USB descriptors to hook driver 230*a* and hook driver 230*a* can cause USB bus driver 230 to enumerate a pseudo USB device using the set of pseudo USB descriptors to thereby cause the operating system to load stub driver 320.

Method 600 includes an act 604 of reporting, by the stub driver and to a proxy, that a USB device has been connected to the client terminal to thereby cause the proxy to redirect the USB device to a server. For example, stub driver 320 can report actual USB descriptors to proxy 210 to allow proxy 210 to report the connection of an actual USB device to client terminal 102 to thereby cause a USB device stack for the USB device to be loaded on the server.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed on a client terminal, for enabling a non-USB device to be redirected to a server as a USB device, the method comprising:

detecting, by a filter driver that is loaded above a non-USB driver on a device stack of the non-USB device when the non-USB device is connected to the client terminal, that the non-USB device has been connected to the client terminal;

obtaining, by the filter driver, information about the non-USB device;

employing the information to identify a set of pseudo USB descriptors that are associated with the non-USB device;

sending the set of pseudo USB descriptors to a hook driver that is configured to modify enumeration functionality of a USB bus driver that is loaded on a USB device stack;

causing, by the hook drive, a pseudo USB device to be enumerated based on the set of pseudo USB descriptors such that a stub driver is loaded on the client terminal; and reporting, by the stub driver and to a proxy, that a USB device has been connected to the client terminal to thereby cause the proxy to redirect the USB device to a server.

2. The method of claim 1, further comprising:
receiving, at the stub driver, a USB request block that targets the USB device;
extracting content from the USB request block; and
providing the content to the filter driver for routing to the non-USB device.

3. The method of claim 1, wherein obtaining the information about the non-USB device comprises sending one or more requests down the device stack of the non-USB device.

4. The method of claim 1, wherein the information about the non-USB device comprises a function performed by the non-USB device.

5. The method of claim 1, wherein the information about the non-USB device comprises an interface by which the non-USB device connects to the client terminal.

6. The method of claim 1, wherein the hook driver causes the pseudo USB device to be enumerated by causing a USB bus driver to report the set of pseudo USB descriptors to a plug-and-play manager.

7. The method of claim 1, wherein reporting to the proxy that the USB device has been connected comprises reporting a set of USB descriptors for the USB device.

8. The method of claim 1, wherein the set of USB descriptors that are reported to the proxy are based on a type of the non-USB device.

9. The method of claim 1, wherein the set of USB descriptors that are reported to the proxy are based on a function of the non-USB device.

10. The method of claim 2, wherein the USB request block is received from the server via the proxy.

11. One or more computer storage media storing computer-executable instructions which when executed on a client terminal implement the following components:
a filter driver that is configured to be loaded above a non-USB driver on a device stack of a non-USB device when the non-USB device is connected to the client terminal, the filter driver being further configured to obtain information about the non-USB device, identify, using the information, a set of pseudo USB descriptors for the non-USB device, and provide the set of pseudo USB descriptors to a hook driver;
the hook driver that is configured to modify enumeration functionality of a USB bus driver that is loaded on a USB device stack including causing a pseudo USB device to be enumerated using the set of pseudo USB descriptors; and
a stub driver that is configured to be loaded when the pseudo USB device is enumerated, the stub driver being further configured to report a set of USB descriptors to a proxy to cause the proxy to redirect a USB device to a server, the stub driver being further configured to receive USB request blocks that target the USB device, extract a payload from each USB request block, and provide the payload to the filter driver for routing to the non-USB device.

12. The computer storage media of claim 11, wherein filter driver obtains the information about the non-USB device by sending one or more requests down the device stack of the non-USB device.

13. The computer storage media of claim 11, wherein the stub driver selects the set of USB descriptors to report to the proxy based on a type of the non-USB device such that the non-USB device and the USB device that is redirected to the server are of the same type.

14. The computer storage media of 11, wherein the stub driver is further configured to receive responses from the non-USB device via the filter driver and to format the responses into USB request blocks for transfer back to the server via the proxy.

15. The computer storage media of claim 11, wherein the hook driver modifies the enumeration functionality of the USB bus driver by hooking functions that respond to enumeration functionality of the USB bus driver by hooking functions that respond to enumeration requests sent by an operating system on the client terminal.

16. The computer storage media of claim 11, wherein the non-USB device is connected to the client terminal via one of a serial port, a parallel port, a wireless protocol, or a GPIO pin or port.

17. A method for enabling a non-USB device that is connected to a client terminal to be accessed from a server as a USB device, the method comprising:
detecting, by a filter driver that is loaded above a non-USB driver on a device stack of the non-USB device when the non-USB device is connected to the client terminal, that the non-USB device has been connected to the client terminal;
obtaining, by the filter, information about the non-USB device;
employing the information to identify a set of pseudo USB descriptors that are associated with the non-USB device;
sending the set of pseudo USB descriptors to a hook driver that is configured to modify enumeration functionality of a USB bus driver that is loaded on a USB device stack;
causing, by the hook drive, a pseudo USB device to be enumerated based on the set of pseudo USB descriptors such that a stub driver is loaded on the client terminal; and
reporting, by the stub driver and to a proxy, that a USB device has been connected to the client terminal;
reporting, by the proxy and to the server, that the USB device has been connected to the client terminal to thereby cause a USB device stack for the USB device to be loaded on the server;
receiving, from the server, a USB request block that targets the USB device;
routing the USB request block to the stub driver;
extracting, by the stub driver, content of the USB request block; and
providing the extracted content to the filter driver to thereby allow the filter driver to direct the content to the non-USB device.

18. The method of claim 17, further comprising:
receiving, by the stub driver and via the filter driver, a response from the non-USB device;
formatting the response into a USB request block; and
sending the USB request block containing the response to the server.

19. The method of claim 17, wherein obtaining the information about the non-USB device comprises sending one or more requests down the device stack of the non-USB device.

20. The method of claim 19, wherein the information about the non-USB device comprises one or both of:
a function performed by the non-USB device; or
an interface by which the non-USB device connects to the client terminal.

* * * * *